US008487548B2

(12) United States Patent
Shteynberg et al.

(10) Patent No.: US 8,487,548 B2
(45) Date of Patent: Jul. 16, 2013

(54) SYSTEM AND METHOD FOR DRIVING LED

(75) Inventors: Anatoly Shteynberg, San Jose, CA (US); Harry Rodriguez, Gilroy, CA (US)

(73) Assignee: Point Somee Limited Liability Company, Dover, DE (US)

( * ) Notice: Subject to any disclaimer, the term of this patent is extended or adjusted under 35 U.S.C. 154(b) by 0 days.

(21) Appl. No.: 13/558,237

(22) Filed: Jul. 25, 2012

(65) Prior Publication Data

US 2012/0286671 A1 Nov. 15, 2012

Related U.S. Application Data

(60) Division of application No. 12/497,682, filed on Jul. 5, 2009, now Pat. No. 8,232,735, which is a division of application No. 11/838,186, filed on Aug. 13, 2007, now Pat. No. 7,583,035, and a division of application No. 11/838,208, filed on Aug. 13, 2007, now Pat. No. 7,710,047, said application No. 11/838,186 is a division of application No. 11/142,859, filed on May 31, 2005, now Pat. No. 7,276,861, said application No. 11/838,208 is a continuation of application No. 11/142,859, filed on May 31, 2005, now Pat. No. 7,276,861.

(60) Provisional application No. 60/611,539, filed on Sep. 21, 2004.

(51) Int. Cl.
*G05F 1/00* (2006.01)

(52) U.S. Cl.
USPC ........ 315/291; 315/247; 315/185 S; 315/312; 315/224

(58) Field of Classification Search
USPC ................. 315/291, 307–312, 247, 224, 225, 315/209 R, 276, 278, 185 S
See application file for complete search history.

(56) References Cited

U.S. PATENT DOCUMENTS

| | | |
|---|---|---|
| 5,465,029 A | 11/1995 | Hanazaki |
| 6,177,764 B1 | 1/2001 | Schwerman |
| 6,239,558 B1 | 5/2001 | Fujimura |
| 6,515,434 B1 | 2/2003 | Biebl |
| 6,747,420 B2 | 6/2004 | Barth |
| 6,853,155 B2 | 2/2005 | Yamamoto |
| 7,276,861 B1 | 10/2007 | Shteynberg |
| 2006/0006818 A1 | 1/2006 | Fishbein |
| 2008/0129220 A1 | 6/2008 | Shteynberg |

*Primary Examiner* — Tuyet Thi Vo
(74) *Attorney, Agent, or Firm* — Christensen O'Connor Johnson Kindness PLLC

(57) ABSTRACT

A system drives one or a plurality of LEDs, regulating their brightness by controlling the LEDs' average current or voltage. The system includes a switching power converter and an integrated digital regulator with at least one of electrical, thermal, and optical feedbacks. The regulator is constructed as a hysteretic peak current mode controller for continuous mode of operation of the power converter. For a discontinuous mode of operation of the power converter, a pulse averaging sliding mode control is used. Average LED current is measured by integrating LED pulse current at off time and hysteretically adjusting on time of the power switch. An input battery is protected from discharging at abnormally low impedance of the output.

14 Claims, 14 Drawing Sheets

SYSTEM AND METHOD FOR DRIVING LED

CROSS-REFERENCES TO RELATED APPLICATIONS

This application is a division of U.S. patent application Ser. No. 12/497,682, filed Jul. 5, 2009 (now U.S. Pat. No. 8,232, 735), which is a division of U.S. patent application Ser. No. 11/838,186, filed Aug. 13, 2007 (now U.S. Pat. No. 7,583, 035), which is a division of U.S. patent application Ser. No. 11/142,859, filed May 31, 2005 (now U.S. Pat. No. 7,276, 861), which claims the benefit of U.S. Provisional Patent Application No. 60/611,539, filed Sep. 21, 2004. U.S. patent application Ser. No. 12/497,682, filed Jul. 5, 2009, is also a division of U.S. patent application Ser. No. 11/838,208, filed Aug. 13, 2007 (now U.S. Pat. No. 7,710,047), which is a continuation of U.S. patent application Ser. No. 11/142,859, filed May 31, 2005 (now U.S. Pat. No. 7,276,861), which claims the benefit of U.S. Provisional Patent Application No. 60/611,539, filed Sep. 21, 2004. Each of the disclosures of said applications are incorporated by reference herein in their entirety.

BACKGROUND

Known in the industry are a few drivers for light emitting diodes ("LEDs"), like charge pumps with the multi-output current mirror from National Semiconductor. These drivers cannot economically boost input voltage more than 1.5 to 2 times and therefore call for parallel circuits for identical driving of multiple LEDs. That makes these drivers large and expensive. Also desired in this case is a linear current regulator in each channel which compromises the efficiency of an LED driver.

Also known is an inductor based boost converter, like LT 1932 from Linear Technology™ or NTC5006 from On—Semiconductor™. The most frequently used topology is a current mode regulator with the ramp compensation of PWM circuit. Such a current mode regulator needs relatively many functional circuits and still exhibit stability problems when it is used in the continuous current mode with the duty ratio over 50%. As an attempt to solve these problems, the designers introduced constant off time boost converter or hysteric pulse train booster. While they addressed the problem of stability, hysteretic pulse train converters exhibit difficulties with meeting EMC and high efficiency requirements.

U.S. Pat. Nos. 6,515,434 and 6,747,420 provide some solutions outside original power converter stages, focusing on additional feedbacks and circuits, which eventually make the driver even larger.

To overcome the problems listed above, a process and system is disclosed for controlling a switching power converter, constructed and arranged for supplying power to one or a plurality of LEDs to reduce the size and cost of LED driver. Also disclosed is a controller which is stable regardless of the current through the LED. Further disclosed is a high efficiency LED driver with a reliable protection of driver components and input battery from discharging at the damaged output.

SUMMARY

An LED, having a diode-type volt amp characteristic, presents a very difficult load for voltage type regulators. That is why all up to date LED drivers are constructed as a regulated current source, including the referenced prior art in FIG. 1. The current regulator in FIG. 1 includes a feedback signal, which is created as a voltage signal proportional to the average LED current. In practically all switching LED drivers, current through an LED is a stream of high frequency pulses, and the above-described feedback introduces phase delays, makes for poor dynamic response, and prevents a regulator from acting within one switching cycle.

DESCRIPTION OF THE DRAWINGS

The teachings of the present disclosure can be readily understood by considering the following detailed description in conjunction with the accompanying drawings.

DETAILED DESCRIPTION

Figure 1:
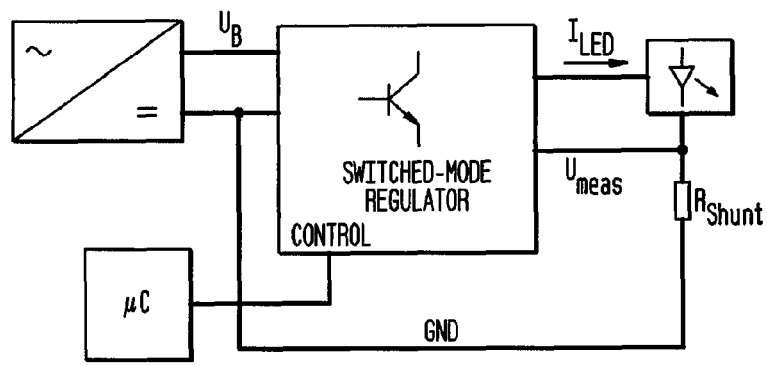
FIG. 1 is a prior art current regulator according to U.S. Pat. No. 6,747,420 B2.

The embodiments of the present disclosure will be described below with reference to the accompanying drawings. Like reference numerals are used for like elements in the accompanying drawings.

Figure 2:
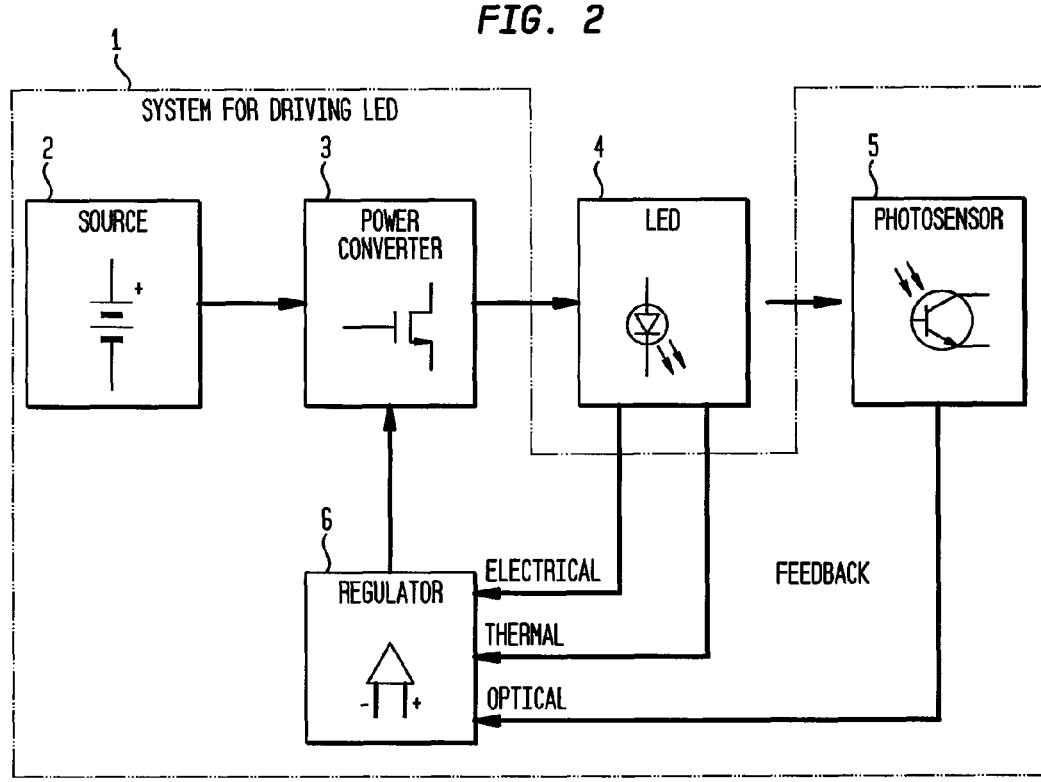
FIG. 2 is a system for driving one or a plurality of LEDs.

FIG. 2 is a system 1 for driving one or a plurality of LEDs, according to one embodiment of the disclosure. The system 1 includes an energy source 2 and a switching power converter 3 driving a string of LEDs 4. The performance of the LEDs is measured by electrical and thermal sensors (not shown separately from LED unit 4) and a photosensor 5. These sensors generate electrical, thermal, and optical feedback channels coupled with a regulator 6 controlling the output of the power converter 3. The regulator 6, according to one embodiment of the disclosure, can have as a minimum a single electrical feedback. Yet, it may use additional thermal and optical feedback channels for enhanced performance, according to another embodiment of the disclosure. The energy source 2 is an AC/DC converter, connected to the AC utility line (not shown) in one embodiment of the disclosure. The energy source 2 is a DC/DC converter connected to any DC voltage source (not shown) according to another embodiment of the disclosure. Yet in another embodiment of the disclosure the energy source 2 is a battery, which may be of a variety of technologies (like solar panels or electrical rechargeable or non-rechargeable batteries of varieties of chemistries). The regulator 6 is constructed as analog, mixed signal, or digital functional block according to embodiments of the disclosure. A fixed high frequency oscillator (not shown) is supplying clock signal to the regulator 6.

Figure 3:
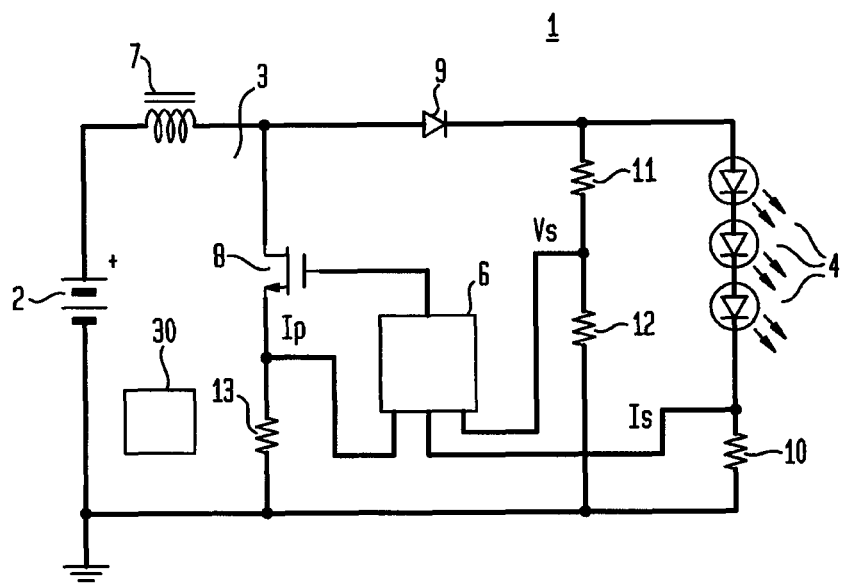
FIG. 3 is a step up converter for driving one or a plurality of LEDs.
Figure 4:
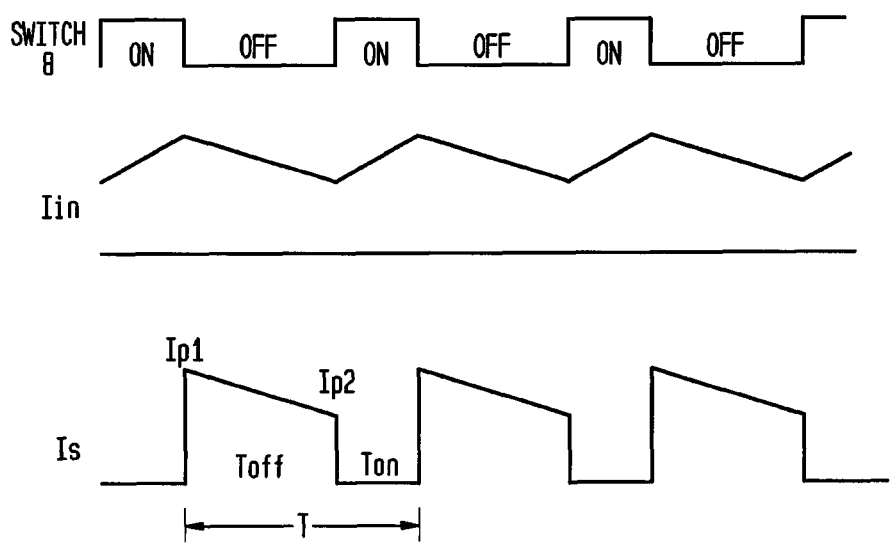
FIG. 4 is a diagram illustrating current waveforms of a switching converter according to one embodiment of the present disclosure.

The power converter in FIG. 2 is a step up (if the source voltage should be boosted) or a step down (if the source voltage should be decreased) switching converter, such as inductor-based boost, or buck boost topology according to the embodiments of the disclosure. FIG. 3 is a system 1 with a boost power converter 3 comprising a battery 2, inductor 7, a semiconductor power switch 8, a rectifier 9, regulator 6, an Ip peak current sensor 13, an LEDs current sensor 10, a voltage sensor 11 and 12, a string of LEDs 4, and an oscillator 30, according to one embodiment of the disclosure. The performance of the boost converter 3 is illustrated by FIG. 4. The power switch 8 is turned on and off by the regulator 6, storing energy in the inductor 7 at on time and discharging it into the LEDs 4 at off time. Current in the inductor 7 is shown in FIG. 4 as continuous. However it may also be discontinuous, depending on the mode of operations (not shown). The current through LEDs 4 is marked as Is and represents a stream of high frequency pulses, shaped during off time of the converter 3. When the power switch 8 is closed, energy is stored in the inductor 7. The inductor current increases to a value of $I_{P1}$, that is determined by the on time of the power switch, the inductor value and battery voltage. When the power switch 8 is open, the energy in the inductor 7 is delivered to the load. The inductor current during this time decreases to a value of $I_{P2}$, which is dependent on the off time of the power switch. Assuming ideal components, the relationship between input voltage and other parameters can be defined by the following equation:

$$V_{IN}=L(I_{P1}-I_{P2})/T_{ON}, \quad (1)$$

Where
 $V_{IN}$=DC input voltage,
 $I_{P1}$=peak current in the inductor at the end of charging,
 $I_{P2}$=peak current in the inductor at the beginning of the inductor charging,
 $T_{ON}$=on time,
 L=inductance.

When the power switch 8 is open, the inductor 7 discharges energy into the output load. The output voltage is defined by the following equation:

$$-V_{IN}+V_{OUT}=L(I_{P1}-I_{P2})/T_{OFF}, \quad (2)$$

Where
 $V_{OUT}$=DC output voltage
 $T_{OFF}$=off time
Assuming average LEDs current:

$$I_{AVG}=V_{OUT}/R_D \quad (3)$$

RD=equivalent DC resistance of the LEDs is assumed to be known.

$$I_{AVG}=(I_{P1}+I_{P2})T_{OFF}/2(T_{ON}+T_{OFF}) \quad (4)$$

and assuming a steady process, $$V_{IN}*T_{ON}=(-V_{IN}+I_{AVG}*R_D)*T_{OFF} \quad (5)$$

The on time can be determined by the following equation:

$$T_{ON}=(-V_{IN}+I_{AVG}*R_D) \quad (6)$$

The frequency of the output is equivalent to:

$$f=1/(T_{ON}+T_{OFF}) \quad (7)$$

Solving equations (1) through (6), $$I_{P1}=(V_{OUT}-V_{IN})T_{OFF}/2L+I_{AVG}(V_{OUT}/V_{IN}) \quad (8)$$

$$I_{P2}=(V_{OUT}-V_{IN})T_{OFF}/2L-I_{AVG}(V_{OUT}/V_{IN}) \quad (9)$$

Figure 5:
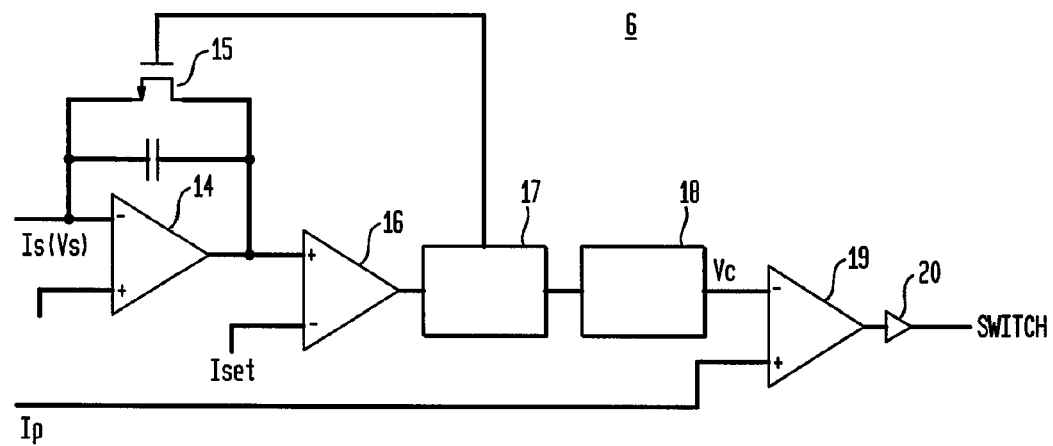
FIG. 5 is a block diagram of a regulator with an integrator according to an embodiment of the invention at constant switching frequency.
Figure 6:
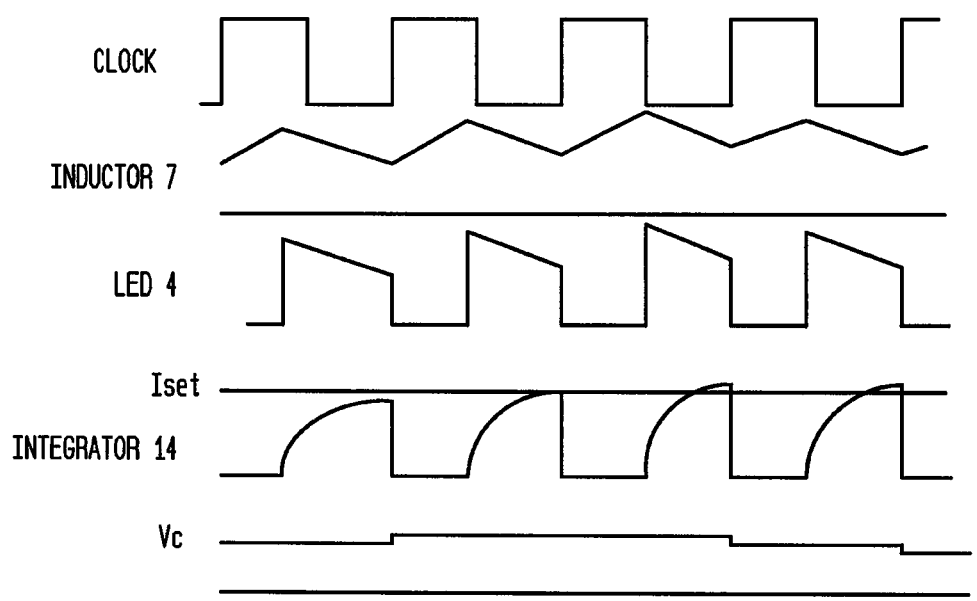
FIG. 6 is a diagram illustrating signal waveforms in a regulator with an integrator.

FIG. 5 is a regulator 6, according to one embodiment of the disclosure, and comprising input to LEDs current feedback Is (or voltage Vs), an integrator 14 with a reset switch 15, an LEDs current comparator 16, digital logic 17, an A/D converter 18, an Ip peak current comparator 19, and a buffer 20 driving the power switch 8. The following theoretical analysis represents a synthesis of the process of driving of a nonlinear load (like a single or multiple strings of LEDs) from a current source, regulating averaged current or voltage at the load. FIG. 6 illustrates the LEDs 4 current and the inductor 7 current. The integrator 14 integrates LED 4 current signal, shown as a waveform for integrator 14 in FIG. 6. The integral of the LEDs 4 current during the off time:

$$\int_0^{T_{off}} Is\,dt = \int_0^{T_{off}} \left(Ip1 - (Ip1 - Ip2)\frac{t}{T_{off}}\right) dt \quad (10)$$
$$= (Ip1 - Ip2)\frac{T_{off}}{2}$$

According to the waveform for LEDs 4 in FIG. 6 the average LEDs current is equal to $$Iavg = (Ip1 + Ip2)\frac{T_{off}}{2T} \quad (11)$$

T-cycle time

Comparing Iavg in equation (11) and integral (10) we can make a conclusion that the integral (10) would be (a) proportional to the average LEDs current if cycle time T is constant and (b) equal to the average LEDs current if the integrated value is divided by cycle time T. In one embodiment of the disclosure the process of driving LEDs with the constant switching frequency is based on steps of storing energy in the inductor during on time of the power switch, discharging it into LEDs during off-time of the power switch, measuring ampseconds of said inductive element at off time and adjusting peak current through the said switch to keep said off time ampseconds in the inductor during off time constant and proportional to the set average current through LEDs. Thus, the disclosure is using generation of the off time ampseconds signal in the inductor as one switching cycle feedback. The ampseconds are measured by integrating discharging inductor 7 current during off time, sampling the integrator 14 at the end of off time, and resetting the integrator 14 during on time.

Expression (10) is a theoretical interpretation of the method: to keep LED brightness constant at constant frequency, the input voltage changes are compensated in such a manner that the inductor off time ampseconds and average current of the LED remains constant (or regulated). The method is illustrated on FIG. 5 and FIG. 6. The integrator 14 starts integrating the LED current at the beginning of off time. At the end of the cycle the digital logic 17 samples the output of the integrator 14. At the same time the power switch 8 is turned on. Sampled voltage (V14) from integrator 14 is compared with the Iset signal. If V14<Iset then logic adds a ΔVc signal to the switch comparator 19 reference voltage Vc=Vc+ ΔVc. When Ip reaches its set value by Vc the comparator 19 turns off the power switch. If V14>Iset then Vc=Vc−ΔVc and new peak current will be reduced. During on time the output of the integrator 14 is shorted by the reset switch 15. In one embodiment of the disclosure, updating of the control voltage Vc is linear:

| Iset = V14 | Vc(n + 1) = Vcn |
| Iset > V14 | Vc(n + 1) = Vcn − ΔVc |
| Iset < V14 | Vc(n + 1) = VcnT + ΔVc |

Thus regulator 6 in FIG. 5 provides hysteretic current mode control of LED current with a dynamic response within one switching cycle. In normal conditions, the output current will be hysteretically adjusted at the set level. That makes the controller inherently stable and does not require compensation. At transient (change of Vin, temperature or LED performance, including shorted or open device) the controller will adjust primary peak current to have LED current equal to Iset.

Figure 7:
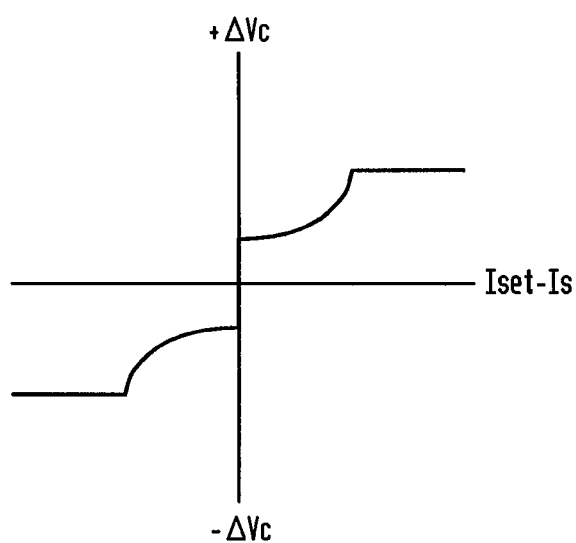
FIG. 7 is a diagram of a nonlinear control voltage dependent on the current error Iset−Is.

In yet another embodiment of the disclosure, the control voltage ΔVc is adjusted based on function presented in FIG. 7, inversely proportional to a difference between set and measured signals.

Figure 5A:
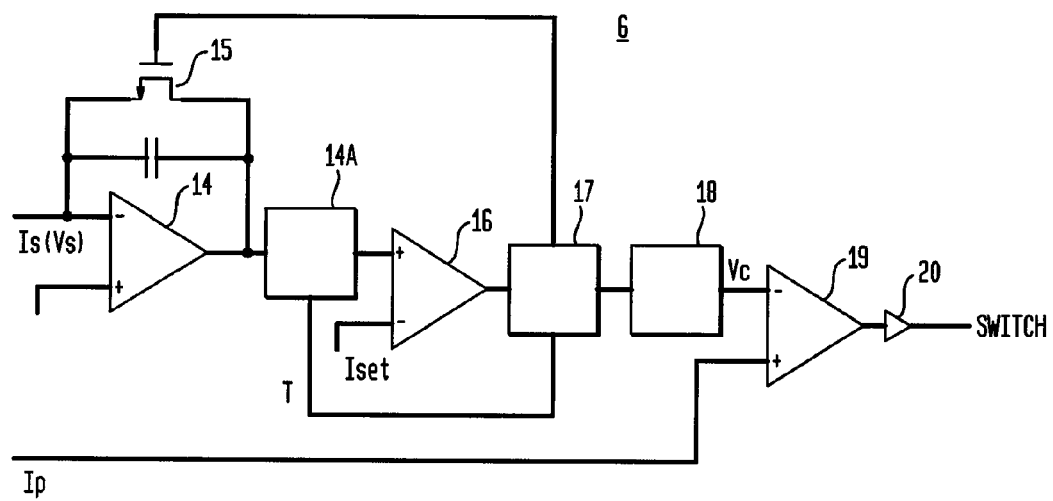
FIG. 5A is a block diagram of a regulator with an integrator according to an embodiment of the invention at a variable switching frequency.

In yet another embodiment of the disclosure, shown in FIG. 5A, the off time is kept constant by digital logic 17 and cycle time is variable, defined by the controller (regulator) 6. In this embodiment, a divider by cycle time 14A is added to the output of integrator 14, and the output of the divider 14A is connected to the positive terminal of LED comparator 16.

Figure 8:
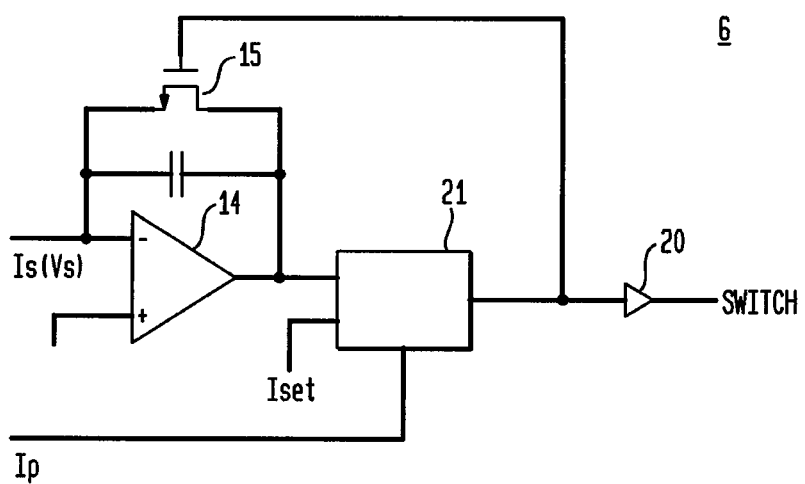
FIG. 8 is a block diagram of a regulator with an integrator according to another embodiment of the invention.

Different combinations of the circuits may be used to drive one or multiple of LEDs according to said method. A digital implementation of the same regulator 6 is shown on FIG. 8, where 21 is a digital logic, combining various functional blocks of FIG. 5.

Traditionally, in peak current mode control regulation, a user specifies a reference current, and then the power switch switches off when the inductor current rises to this reference current (minus an appropriate slope compensation to maintain global stability). However, in pulsed current averaging, we propose to regulate differently: we propose to directly regulate the length of power switch on time ($T_{on}$) in order to create the desired peak value $I_p$. We then relate this peak value to the load output current's average value. Hence, load current regulation becomes possible. Since LEDs call for current regulation instead of voltage regulation, this makes pulsed current averaging a prime candidate for its application. Our goal is now to relate the control variable $T_{on}$ to the output current through the load. Peak current in the inductor, assuming discontinuous operation:

$$Ip = \frac{VinTon}{L} \quad (12)$$

Ip—Peak current in the inductor 7
Vin—Input voltage

Average current in the load:

$$Iav = \frac{IpToff}{2T} \quad (13)$$

Volt second balance of the inductor $$Vin*Ton=(Vout-Vin)Toff, \quad (14)$$

where
Vout—Output average voltage
Combining equations (12) to (14) and solving it to $T_{on}$ we'll get dependence of average current from the variable $T_{on}$:

$$Iav = Ton\frac{V_{in}^2}{2LVout} \quad (15)$$

The conclusion of this simplified analysis is that the on time of the power switch is proportional to the output current. Thus, by adjusting $T_{on}$, the output current through the load will be changed in a linear relation. Notice, also, that the output current is inversely proportional to the output voltage in this relation. Therefore, in systems in which output voltage may quickly deviate from a desired value, this method may need to utilize advanced nonlinear controllers for regulation. This has compelled researchers to utilize multiplications in controllers to adjust $T_{on}$. That is, an inner current loop in power factor correction circuits often makes $T_{on} \propto kV_{OUT}$ ($I_{Ref}-I_L$). This is obviously a more complicated and nonlinear controller because it uses digital multiplication, as well as an additional outer voltage loop (usually PI controller) to help regulate the voltage.

Instead of a complicated approach to control, we propose to use the relation of $T_{on}$ to $I_{av}$ in a hysteretic/sliding mode scheme that simplifies implementations and may not use external A/D converters. The idea is to increase or decrease $T_{on}$ by discrete pulses in order to control the average current being delivered to a load: hence, the terminology pulse average current control. Conventional methods for controlling the current output of commercially available integrated circuits for LEDs drivers uses a combination of analog operational amplifiers and compensation ramp generators. We have come up with a digital control approach to controlling output currents that does not use these additional parts. This is not a DSP engine with software overhead; this is an optimized digital core that uses a sliding control algorithm to determine the amount of power to transfer to the output using a boundary/sliding mode control criteria.

Figure 9:
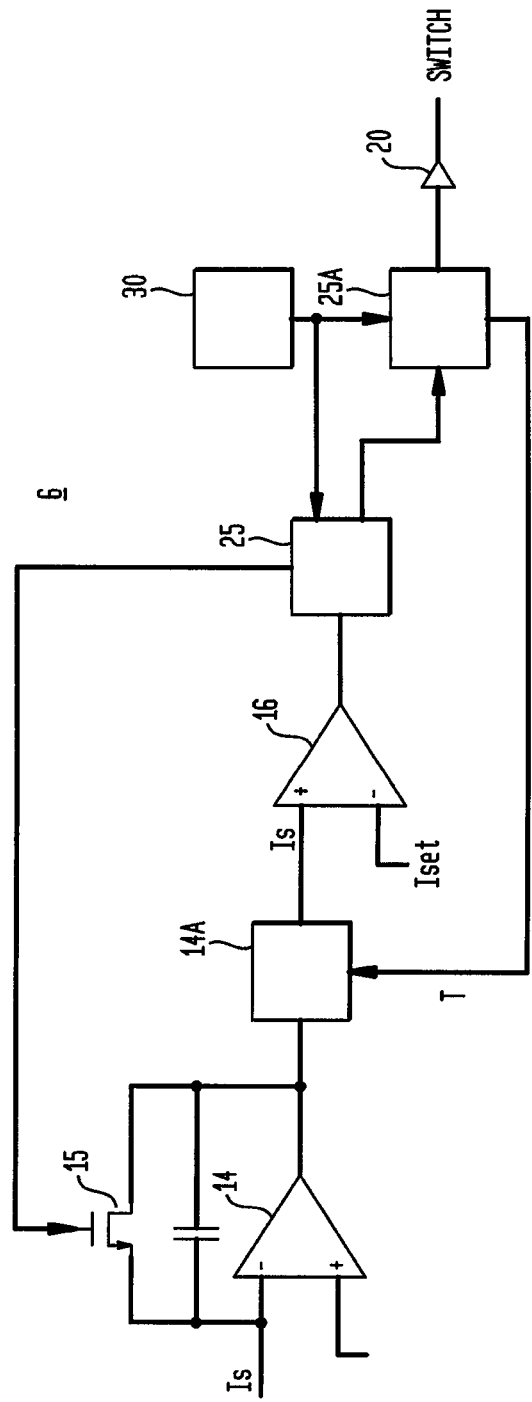
FIG. 9 is a block diagram of a regulator according to the sliding mode control of the invention.

To demonstrate the proposed regulation approach according to one embodiment of the disclosure and show its potential, we describe the pulsed average current regulation using a simple hysteretic controller. The pulse average current regulation comprises the following steps, see FIG. 3 and FIG. 9:
oscillator turns on switch 8, and current starts building in the inductor 7; at the same time Time register $T_{on}+/-\Delta t_{on}$ is set with the count of time $T_{on}$, when $t=T_{on}$ switch 8 is turned off, Inductor 7 starts to discharge (it is assumed that the conversion process is discontinuous);
LED current is sensed and integrated by integrator 14 for a period of off time $T_{off}$;
the integrated value is sampled by digital logic 25 at the end of cycle time and integrator 14 is reset by switch 15;
sampled integrated value is divided in divider 14A by cycle time T and it is compared with the set value of the LED current Iset If Is <Iset The controller selects to change $T_{on}$ by $+\Delta t_{on}$, If Is >Iset The controller selects to change $T_{on}$ by $-\Delta t_{on}$, on time in the Time register 25A is adjusted by $+\Delta t_{on}$ or $-\Delta t_{on}$; and new cycle starts.

If the system detects more than two consecutive cycles with the same sign of $\Delta t_{on}$ increment, the system may use look up tables to adjust these increments to accelerate convergence of measured Is signal and reference Iset.

Figure 9A:
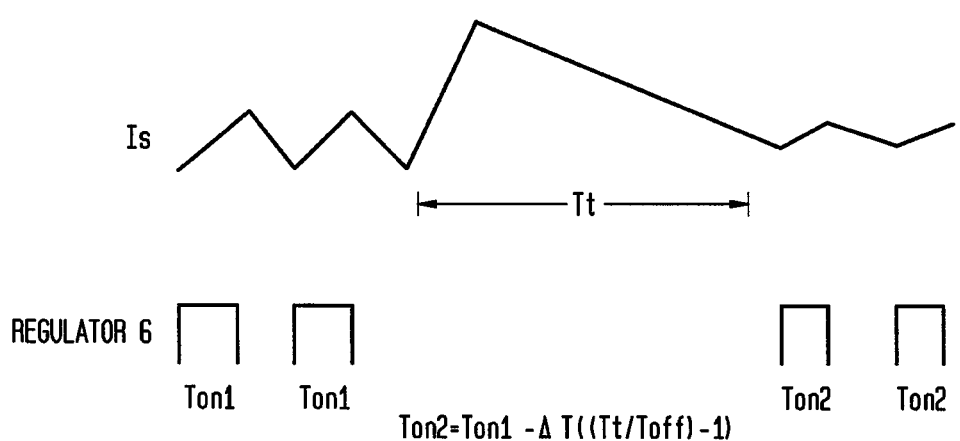
FIG. 9A is a diagram illustrating an algorithm of the sliding mode control of the disclosure.
Figure 9B:
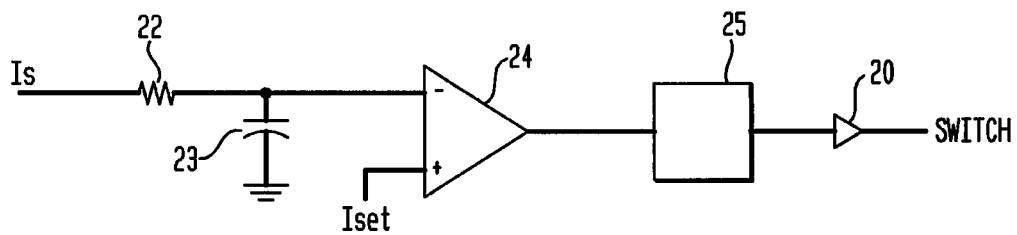
FIG. 9B is a block diagram of a regulator according to a sliding mode control with a passive LED current filter.

A simplified sliding mode regulator is presented in FIG. 9B. Instead of an active integrator 14 with reset, a passive R-C filter (resistor) 22 and (capacitor) 23 are used. That simplifies the implementation at the expense of reduced speed of dynamic response of the regulator. The digital logic 25 combines the functions described above.

In another embodiment of the disclosure (FIG. 9, FIG. 9A) the LEDs comparator 16, as soon as it detects the transition of the Is current over reference Iset, sends the signal (high) to the digital logic 25;

the digital logic 25 starts Iset timer (not shown separately from digital logic 25) and keeps power switch 8 off;

power switch 8 is off and Iset timer is counting time Tt until LED current comparator 16 detects Is transition below I set level by sending a signal (low) to the digital logic 25; and the digital logic stops Iset timer, reads its content and divides it by off time to define new Ton time as $Ton_{i+1}=Ton_i-\Delta ton((Tt/Toff)-1)$.

We call the described process as asymmetrical hysteretic algorithm of adjusting on time $T_{on}$, the purpose of which is to improve the dynamic response of the regulator and limit the ripple of LED current. Asymmetrical hysteretic algorithms include two LED comparators (not shown) each set slightly apart to form a window for current ripple and otherwise working independently and similar to the above described process.

Figure 10:
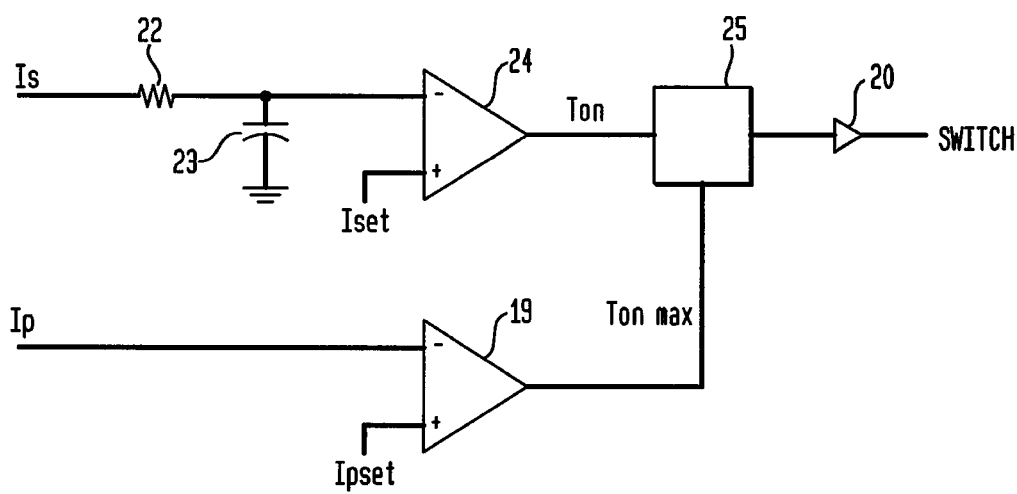
FIG. 10 is a block diagram of a sliding mode control regulator according to another embodiment of the disclosure.

FIG. 10 is a sliding mode regulator 6 with the limited maximum on time $T_{on}$ max or maximum peak current in the inductor. This limit is achieved by adding an Ip peak current comparator 19 to the regulator 6, described in FIG. 9B. Ip comparator is connected with its negative terminal to Ip current sense and it positive terminal to the Ipset reference. The output of comparator 19 is sampled by the digital logic 25 each switching cycle.

Figure 11:
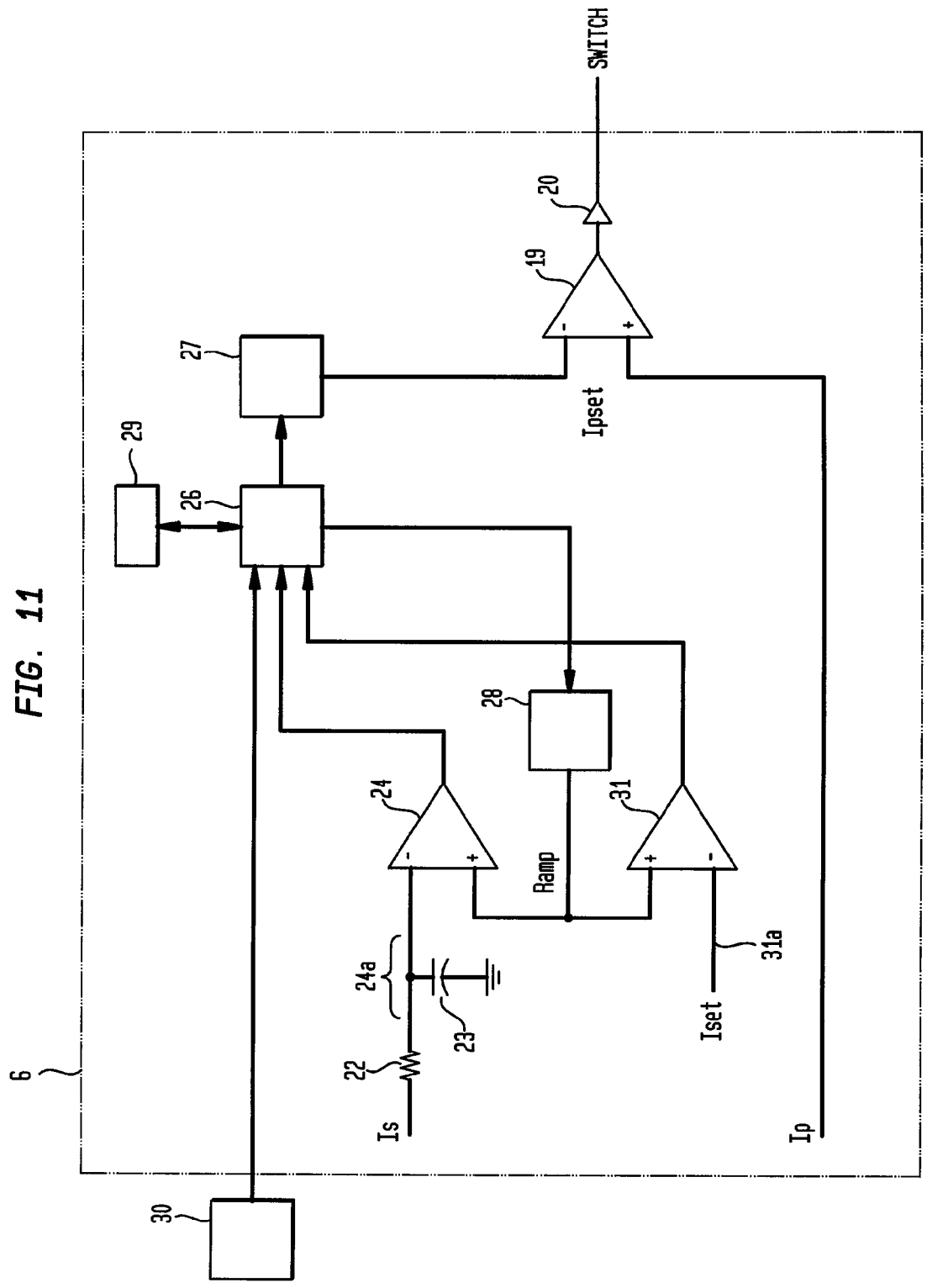
FIG. 11 is a block diagram of a PI regulator with Ipset output according to the disclosure.
Figure 12:
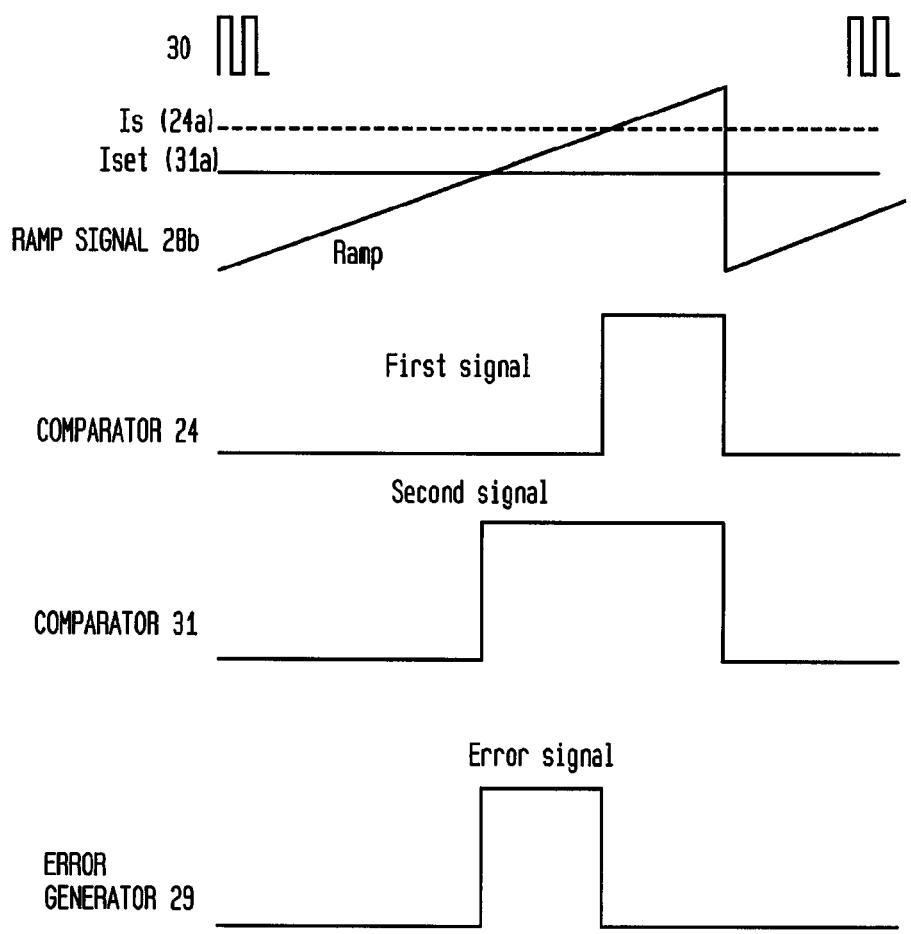
FIG. 12 is a diagram illustrating signal waveforms of an error generator

The above presented sliding mode regulator 6 will be stable in the discontinuous mode of operation. Another embodiment of the disclosure in FIG. 11 is a digital PI or PID regulator capable to drive one or a plurality of LEDS with the continuous current in the switching converter FIG. 3. In the embodiment of FIG. 11, average LED current Is is filtered by a passive R-C network 22, 23. An LED current comparator 24 is connected with its negative terminal to 24a (Is current filter 22, 23), and with its positive terminal to the output of a ramp generator 28. A current set comparator 31 is connected to said ramp generator 28 by its positive terminal. The negative terminal of the comparator 31 is connected to a set current reference signal Iset 31a. Outputs of both comparators 24 and 31 are connected to the digital logic 26. The digital logic 26 controls a ramp generator 28, which generates a periodical ramp signal 28b (as shown in FIG. 12) with the minimum ramp signal selected to meet requirements of a maximum negative error and maximum ramp signal to meet the requirements of a maximum positive error. For example, assuming that at the nominal LEDs current Is signal 24a (as shown in FIG. 12) is 200 mV and maximum negative and positive errors are 25%, then the ramp signal 28b can be at least 150 mV to 250 mV. The time base of this ramp signal is defined by a desired resolution. Selecting, for example, a +/−6 bit resolution will give us at clock frequency 100 MHZ of the oscillator 30 the base time 10×2×64=1280 nS or frequency of 78 kHZ, which is about the frequency of typical LED drivers, meaning that the error generation may have at most one cycle delay. The accuracy of the error generation per given example will be 50×100/200×64=0.39%. Those skilled in the art may design the ramp generator per their specific requirements, using fundamental guidelines of this specification.

As ramp generator 28 starts the ramp, both comparators 24 and 31 are in the same state, low or high. Example of FIG. 12 assumes low. At some moment of the ramp both comparators 24 and 31 will change the state, going high. We call signals generated by the comparator 24 first and by the comparator 31 second. Digital logic 26 samples the comparators 24 and 31 at every clock of oscillator 30 and reads both first and second signals. Whichever signal comes first starts a time counter of an error generator 29. Whichever signal comes last stops the time counter. The digital logic 26 assigns a sign to generated error positive if said first signal comes last and negative if said second signal comes last. The digital logic 26 controls the frequency of the ramp generator 28 and generates an error signal once per cycle of ramp generator frequency. The implementation of digital error estimation was illustrated using relatively simple functional blocks without A/D converters. This implementation does not necessarily need to have the functional blocks described above. Different architectures may be used to make a non DSP digital error estimation by using the following steps according to the provided embodiment of the disclosure:

(a) measuring off time ampseconds of said inductor or directly average LEDs current;

(b) generating a periodical ramp signal at a constant frequency, generally smaller than switching frequency of said power converter, wherein said ramp signal is equal, generally at the middle of the ramp to LEDs current set reference signal;

(c) comparing once per a cycle of said ramp frequency said ampseconds signal with said ramp signal and generating a first signal at the instance when said ramp signal starts exceeding said ampseconds signal;

(d) comparing once per a cycle of said ramp frequency said set reference signal with said ramp signal and generating a second signal at the instance when said ramp signal starts exceeding said set reference signal;

(e) starting an error time counter by said first signal or by said second signal whichever comes first;

(f) stopping said error time counter by said first signal or by said second signal whichever comes last;

(g) reading said error time counter as a digital error and assigning a sign to said error positive if said first signal comes last and negative if said second signal comes last; and (h) resetting all registers and start new cycle of error estimation.

Figure 11A:
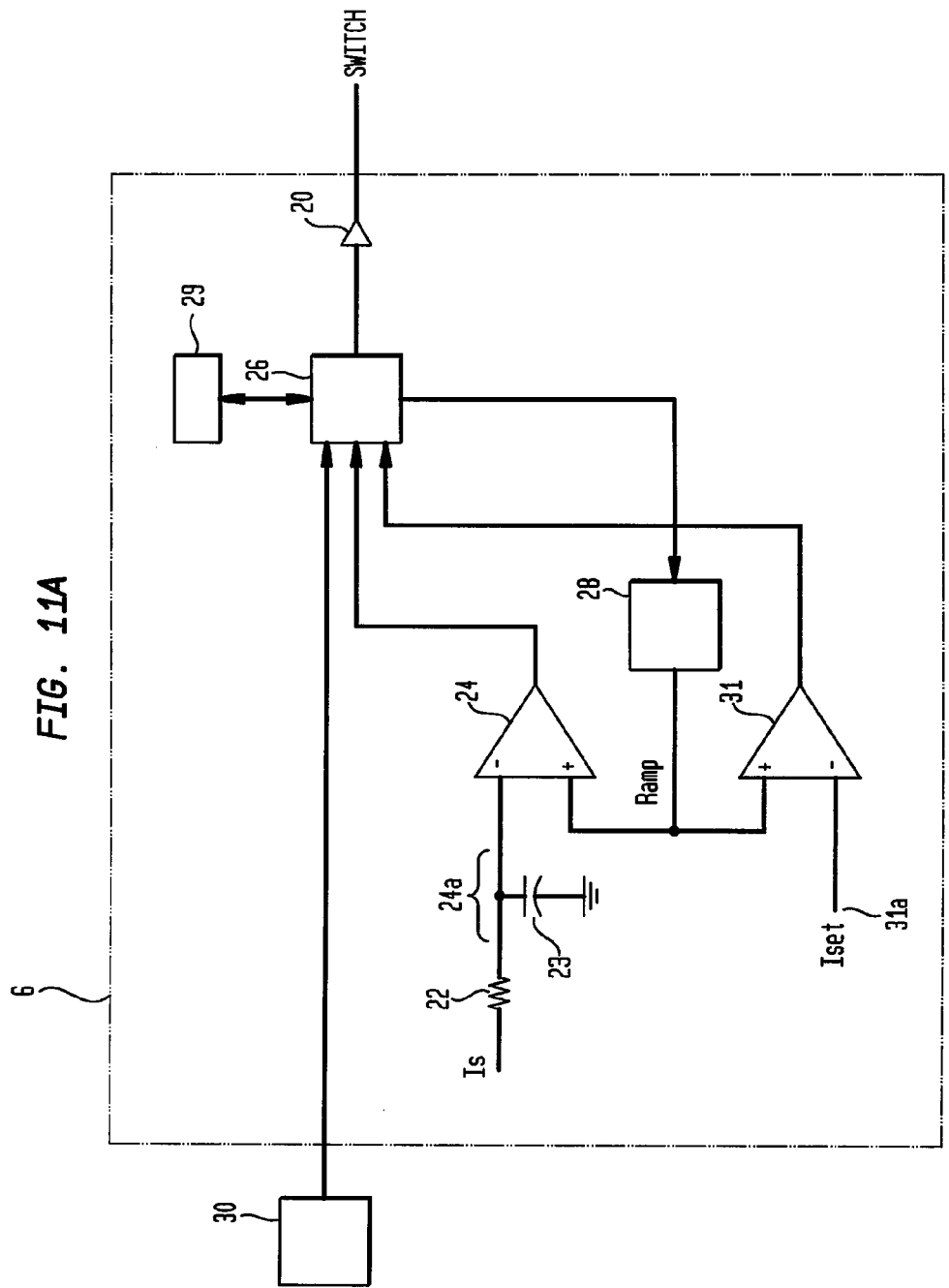
FIG. 11A is a block diagram of a PI regulator with Ton output according to the disclosure.

Digital logic 26 is using the generated error to process it in a digital PI or PID regulator (not shown separately) with desired stability gains of proportional and integrated/differential parts. The output of the PI/PID regulator may generate in digital form either on time Ton for keeping the switch 8 closed (FIG. 11A), or an Ipset level, which is shown in FIG. 11. A D/A converter 27 translates digital form of Ipset into analog which is used by comparator 19 and buffer 20 to drive the switch 8 by regulating its peak current. A PI/PID regulator inside digital logic can be designed with compensation to comply with continuous current performance at any duty cycle with practical limits from 0 to 1.

The design of such compensation can be a routine task. The PID controller has the transfer function:

$$Gc(s) = K_1 + \frac{K_2}{s} + K_3 s$$

where: s=complex variable of Laplace transform,
Gc(s)=compensator,
$K_1$=proportional gain coefficient,
$K_2$=differential coefficient,
$K_3$=Integral coefficient.

The PID controller has a robust performance and a simplicity that allows for digital implementation to be very straight forward.

The Z domain transfer function of a PID controller is:

$$Gc(z) = K_1 + \frac{K_2 Tz}{(z-1)} + K_3 \frac{(z-1)}{Tz}$$

where: z=complex variable of Z transform,
Gc(z)=compensator,
$K_1$=proportional gain coefficient,
$K_2$=differential coefficient,
$K_3$=integral coefficient.

The differential equation algorithm that provides a PID controller is obtained by adding three terms $$u(k)=[K_1+K_2T+(K_3/T)]x(k)+K_3Tx(k-1)+K_2u(k-1)$$

where:
u(k)=the control variable, this signal is used to add or subtract to control pulse,
x(k)=current error sample,
x(k−1)=previous error sample,
T=sampling period,
$K_1$=proportional Gain coefficient.
$K_2$=differential coefficient, and
$K_3$=integral coefficient.

This is a useful control function to create a PI or PID controller simply by setting the appropriate gain to zero. The ramp function will determine a digital value that will serve as the x(k) value in a given control loop. By adjusting gain and delay, precise digital control can be obtained over a variety of systems.

Figure 13:
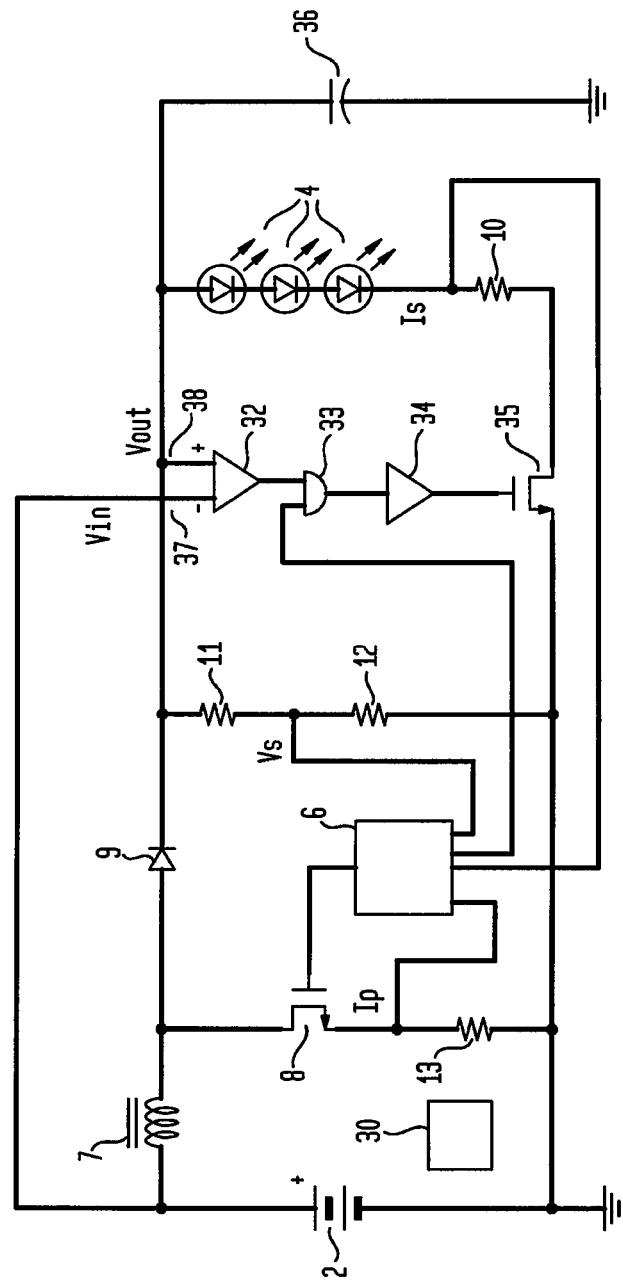
FIG. 13 is a block diagram of a power converter with protection against a short circuit

The system 1 for driving LED in FIG. 13 includes a protection circuit against a short circuit of a single or multiple LEDs, according to another embodiment of the disclosure. The protection circuit comprises a comparator 32, connected to the input 37 and output 38 voltages of the system 1, an AND gate 33, having signals from the regulator 6 and comparator 32, a buffer 34 and a switch 35. At the start of the system 1, input voltage 37 is higher than the output 38, and comparator 32 is low, keeping switch 35 open. When the output capacitor 36 is charged above the input voltage 37, the comparator 32 changes its output to high. Assuming that the enable signal from the regulator 6 is also high, the buffer 34 will keep the switch 35 closed until a short circuit on the output discharges the output voltage 38 below the input voltage 37. The comparator 32 output goes low, opens the switch 35 and disconnects battery 2 from discharging into low impedance.

The protection circuit 32-38 provides adequate current protection to the input battery of the system, however it may overstress the isolation switch 35 at the time capacitor 36 is discharging into low impedance. The circuit in FIG. 14 has an additional comparator 39 to detect the overload or short circuit. At short circuit or overload the comparator 39 instantly goes high (a small filter against noise is not shown). The output signal of the comparator 39 goes to the regulator 6 which in turn shuts down the converter 3 and switches its enable signal at the AND gate 33 from high to low, opening the switch 35. The regulator 6 may be designed with a few options:

to latch off the system until it is recycled by input voltage;
automatically restart the system after a specific delay of time; and
toggle the switch 35 off and on until the output capacitor 36 is discharged (in this case the comparator 32 will prevent the discharging the battery into a small impedance if abnormal situations at the output persists).

Figure 14:
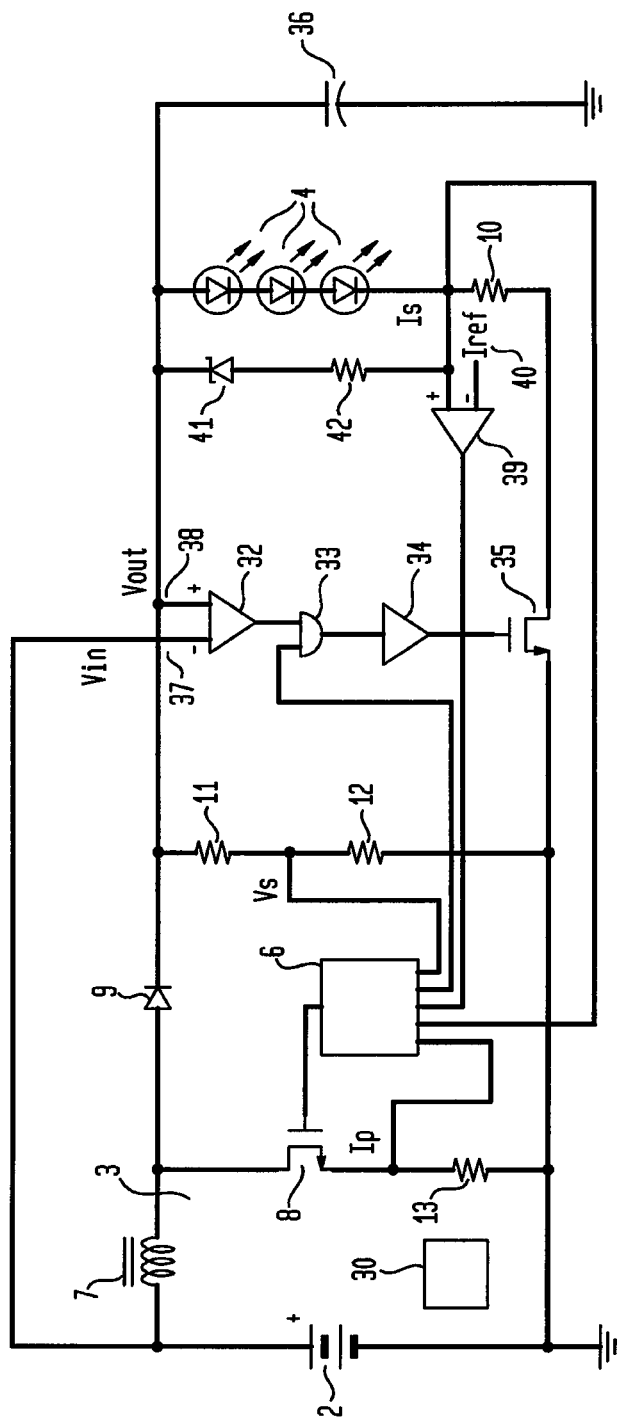
FIG. 14 is a block diagram of a power converter with protection against a short circuit and overvoltage.

Open circuits are one of the common failures of an LED. At this failure an overvoltage is developing very quickly, potentially dangerous to all components of the system. FIG. 14 illustrates another embodiment of the disclosure related to overvoltage protection. If output voltage goes higher than breakdown voltage of a zener diode 41, the excessive voltage appears on the sense terminal of the comparator 39, changing its state to high and triggering protection functions described above.

If regulator 6 gets a signal from the application system to shut down the system 1, it is an advantage of such a system to isolate the battery 2 from driving circuits to save its power. It is a function of another embodiment of the disclosure implemented by a signal of regulator 6 at the AND gate 33. When the signal from the regulator 6 goes low, the switch 35 is open and the battery 2 is disconnected from driving circuits and load.

Figure 15:
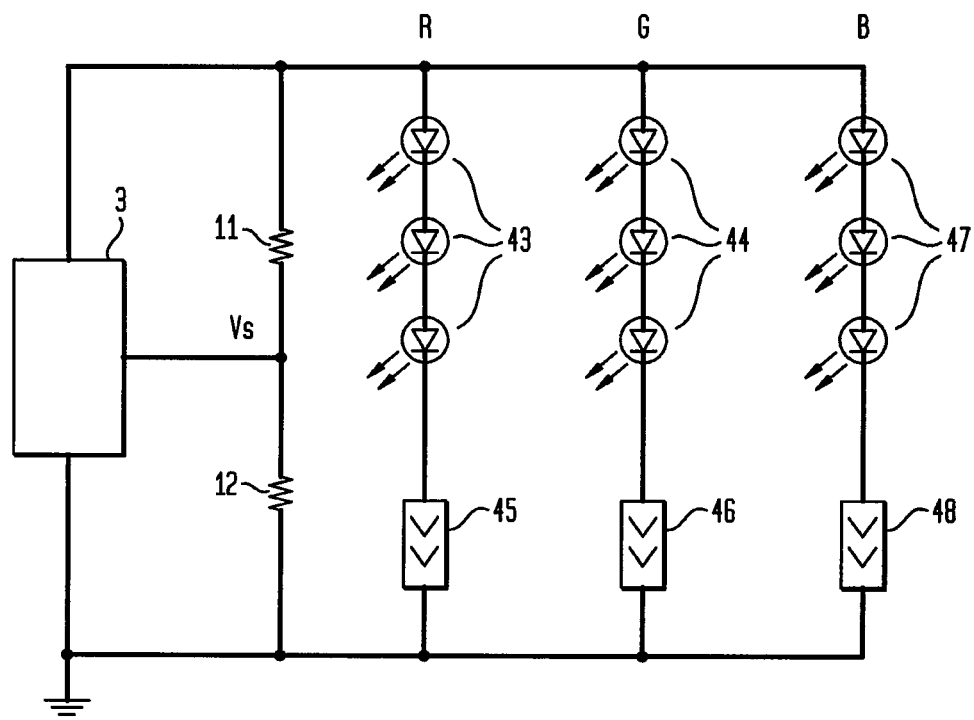
FIG. 15 is a block diagram of a power converter driving strings of R-G-B LEDs with current regulators.

FIG. 15 illustrates a block diagram of R-G-B LEDs connected in three strings 43, 44, 47 with each string having an independent current regulator 45, 46, 48. Such connections of LEDs are typical practice in modem color mixing systems. In this case it is desirable that the power converter 3 is configured to drive one or multiple strings of LEDs with the regulated voltage source with a feedback signal Vs from voltage sensor 11, 12. We described above the method and system for driving a single or a plurality of LEDs, regulating average current through LEDs. All referenced embodiments of the disclosure were illustrated by using current as a variable system parameter to regulate. By a principle of duality of electrical circuits controlling current through components, connected in series and voltage across components connected in parallel, we can use similar systems and methods to drive one or multiple strings of LEDs by controlling voltage across strings of LEDs with some specifics of voltage regulation. For example, in case of voltage regulation, the integrator 14 (FIG. 5) will measure LEDs 43, 44, 47 voltseconds (FIG. 15) by integrating the output voltage for a length of the cycle T and the comparator 16 will have voltage set signal at the negative terminal. All other arrangements of the system will remain the same as described above. Thus, in another embodiment of the disclosure the proposed system will work as a voltage boost or buck-boost converter if input of the regulator 6 is switched to the voltage feedback Vs. Vs is connected to a resistive divider 11, 12. Signal Vs may also represent an output of a light sensing device, then the driver will control light brightness rather than the LED average voltage.

Although the present disclosure has been described above with respect to several embodiments, various modifications can be made within the scope of disclosure. The various circuits described in FIGS. 5, 8, 9, 9B, 10, 11, 13, and 14 are merely representative, and the circuitry and modules may be implemented in various manners using various technologies, digital or analog. Accordingly, the disclosure of the present disclosure is intended to be illustrative, but not limiting, of the scope of the claimed subject matter.

The invention claimed is:

1. A method of controlling a switching power converter configured to supply power to one or more light emitting diodes ("LEDs"), the switching power converter having an on time phase when the power switch is closed and an off time phase when the power switch is open, the method comprising:
   turning a power switch on to provide current through an inductor and the power switch;
   measuring ampseconds of the inductor at an off time;
   comparing the measured ampseconds to a reference signal proportional to an average LED current or brightness;
   generating a signed discrete logical signal based on a difference between an ampseconds signal and the reference signal;
   generating a control signal using the signed discrete logical signal to regulate a peak current through the power switch by keeping the off time ampseconds substantially constant; and
   turning the power switch off.

2. The method of claim 1, further comprising:
   when the power switch is off, providing a conductive path from the inductor to the LED to effectively discharge the inductor and provide energy to the LEDs.

3. The method of claim 1, further comprising:
   turning the power switch on and off at a fixed frequency, wherein said measuring ampseconds of the inductor at an off time includes:
      sensing of an LED current;
      using an integrator, integrating the sensed LED current during the off time;
      sampling an integrated LED current at the end of the off time; and
      resetting the integrator during the on time phase.

4. The method of claim 1, further comprising:
   incrementing or decrementing the control signal by an amount defined in a look-up table, wherein the amount is greater than or equal to a fixed minimum amount and less than or equal to a fixed maximum amount.

5. The method of claim 1, further comprising:
   incrementing or decrementing the control signal, from one cycle to another, by an amount inversely proportional to a difference between the measured ampseconds and the reference signal.

6. The method of claim 1, further comprising:
   turning the power switch on and off at a variable frequency, wherein said measuring ampseconds of the inductor at an off time includes:
      sensing of an LED current;
      using an integrator, integrating the sensed LED current during the off time to provide an integrated signal;
      measuring a last cycle time;
      dividing the integrated signal by the last cycle time;
      sampling the divided integrated signal at the end of the off time; and
      resetting the integrator during the on time phase.

7. The method of claim 1, further comprising:
   regulating an inductor peak current using a hysteretic peak current mode control, wherein said regulating includes:
      generating the control signal as an analog control signal;
      sensing a current through the power switch;
      using the peak current comparator, comparing the sensed power switch current to the analog control signal as a set reference value; and
      turning the power switch off when the sensed power switch current reaches the set reference value.

8. The method of claim 1, further comprising:
   operating the switching power converter in a discontinuous current mode; and
   regulating an inductor peak current using a pulse average sliding mode control by generating the control signal as a digital signal controlling the on time of the power switch.

9. The method of claim 1, wherein said measuring ampseconds of the inductor at an off time comprises sensing and averaging an LED current.

10. The method of claim 1, further comprising:
    regulating LED brightness by sensing an optical output of the LED;
    generating an optical output signal; and
    adjusting the set reference signal to maintain the optical output signal substantially constant.

11. The method of claim 1, further comprising:
    regulating contrast of an illuminated area by sensing optical ambient;
    generating an optical ambient signal; and
    adjusting the set reference signal proportionally to the optical ambient signal.

12. The method of claim 6, further comprising:
    regulating LED brightness over thermal effects by sensing an LED junction temperature;
    generating a temperature signal; and
    adjusting the reference signal using a look-up table comprising emission versus LED temperature performance.

13. The method of claim 1, further comprising:
    operating the switching power converter in a discontinuous current mode; and
    regulating an inductor peak current using a hysteretic pulse frequency modulation by generating the control signal as a digital signal configured to control the on time of the power switch, wherein said generating the control signal includes:
       using the signed discrete logical signal to enable a first mode of an on time adjustment when the LED current is lower than a set reference signal and counting a number of cycles;
       measuring and storing a last cycle time; and
       setting a new cycle time as a sum of the last cycle time and a product of a time increment by the number of cycles minus one.

14. The method of claim 13, further comprising, using the signed discrete logical signal to enable a second mode of an on time adjustment when the LED current is greater than the set reference signal.

* * * * *